United States Patent [19]

Campagnuolo et al.

[11] Patent Number: 4,701,835

[45] Date of Patent: Oct. 20, 1987

[54] MULTIMODE FLASHLIGHT

[75] Inventors: Carl J. Campagnuolo; Asaf A. Benderly, both of Potomac, Md.

[73] Assignee: The United States of America as represented by the Secretary of the Army, Washington, D.C.

[21] Appl. No.: 777,815

[22] Filed: Sep. 19, 1985

[51] Int. Cl.4 .................................. B60Q 1/00

[52] U.S. Cl. .................................. 362/192; 320/2; 320/61; 323/231

[58] Field of Search ............... 362/192, 205, 208, 157, 362/193, 183; 320/2, 61; 323/231

[56] References Cited

U.S. PATENT DOCUMENTS

| | | | |
|---|---|---|---|
| 3,021,468 | 2/1962 | Reich | 320/2 |
| 3,174,552 | 3/1965 | Soucy | 362/192 X |
| 4,227,092 | 10/1980 | Campagnulo et al. | 310/75 B X |
| 4,360,860 | 11/1982 | Johnson et al. | 362/192 |
| 4,489,290 | 12/1984 | Warner | 320/61 X |

FOREIGN PATENT DOCUMENTS

| | | | |
|---|---|---|---|
| 1031943 | 3/1953 | France | 362/192 |

*Primary Examiner*—Carlton R. Croyle
*Assistant Examiner*—Theodore Olds
*Attorney, Agent, or Firm*—Saul Elbaum; Alan J. Kennedy; Thomas E. McDonald

[57] ABSTRACT

A flashlight which can be operated directly either by a rechargeable battery or by a hand-cranked alternator. The alternator can also simultaneously operate the light and recharge the battery, or only recharge the battery. The alternator is integrally attached to a harmonic drive system which allows the alternator rotor to be driven at high speeds.

2 Claims, 7 Drawing Figures

MULTIMODE FLASHLIGHT

RIGHTS OF THE GOVERNMENT

The invention described herein may be manufactured and used by or for the United States Government for Government purposes without the payment to me of any royalty thereon.

BACKGROUND OF THE INVENTION

This invention relates to hand-held and manually operated flashlights. It is particularly directed to flashlights which can be operated without batteries and to flashlights which include rechargeable batteries in which the means for recharging the batteries are contained within the flashlight assembly.

One example of a manually operated flashlight is given in Mazzeo, U.S. Pat. No. 1,576,983. The current for the light is produced by a generator actuated by the stored energy contained in a wound spring. Another example of a purely mechanical flashlight is given in Alexander, U.S. Pat. No. 2,277,897. Here the current for the light is also produced by a generator actuated by the stored energy contained in a wound spring. This device has an additional feature in that the generator rotor shaft is reversible in direction of rotation which allows for the rewinding of the spring while the generator is producing current.

An example of a manually operated flashlight having a generator and a rechargeable battery is given in Speck, U.S. Pat. No. 3,099,402. In this device the generator is driven by a wind-up spring motor. The generator provides current to the light and to the rechargeable battery. This device allows the light to be operated even if the spring motor has wound down.

The patent to Johnson et al, U.S. Pat. No. 4,360,860, discloses a manually operated flashlight which also has a generator and rechargeable batteries. The generator in this device is driven by a gear arrangement, rather than by a spring mechanism in the previously discussed patents. The generator of this device is designed to charge the batteries at a high rate for a short time so as to provide extended operation of the light during a later discharging mode. The batteries also serve to regulate the voltage from the generator while the batteries are being charged to protect the light if it is connected at the same time. This device, however, does not allow the alternator to be directly connected to the light.

OBJECTS OF THE INVENTION

It is an object of the invention to provide a flashlight which can be operated directly either by a rechargeable battery or by a hand-cranked alternator.

It is another object of the invention to provide a flashlight in which the alternator can simultaneously operate the light and recharge the battery, or only recharge the battery.

SUMMARY OF THE INVENTION

Figure 1:
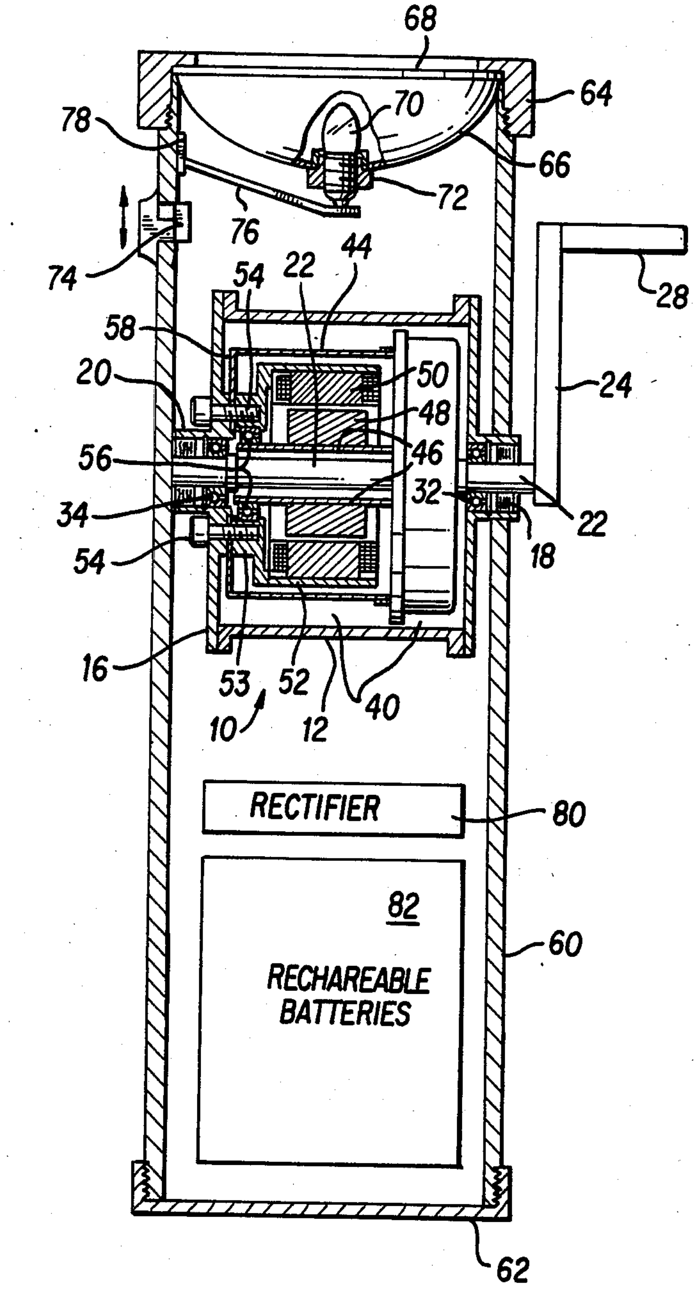
FIG. 1 is a cross sectional view of the preferred embodiment of the multimode flashlight.

The present invention comprises a flashlight which can be operated directly either by a rechargeable battery or by an alternator. Additionally, the alternator can operate the light and recharge the batteries simultaneously. The flashlight comprises a cylindrical case which has a parabolic reflector mounted at one end. An electric light bulb is mounted at the center of the parabolic reflector. Included inside the case are rechangeable batteries, a hand-cranked electrical power source, a rectifier, and an electric switch. The electric switch comprises a first pole, a second pole, a first contact, and a second contact. The second pole is capable of being operated independently of the first pole. The first pole and the second pole are both connected to the rectifier. The first contact is attached to the light bulb, and the second contact is attached to rechargeable batteries. The rechargeable batteries may comprise nickel cadium batteries.

The hand-cranked electrical power source of the present invention comprises an input shaft, means for manually rotating the input shaft, harmonic drive means including means connected to the input shaft so as to rotate therewith and a high speed output shaft, magnetic rotor means connected to rotate with the high speed output shaft, and stator means positioned about the rotor means for generating electrical energy in response to the rotation of said rotor means. The means for manually rotating the input shaft preferably comprises a handle which is connected to one end of the input shaft.

The harmonic drive means comprises a ring-shaped circular spline directly coupled to the input shaft so as to rotate therewith and having a plurality of fine teeth formed on its inner surface, a substantially cylindrical flexspline having an end with a plurality of fine teeth formed thereon and positioned within the circular spline, the number of teeth on the flexspline being different than the number on the circular spline, and a wave generator which is positioned with the spline and which comprises an elliptical ball-bearing assembly to which the high speed output shaft is rigidly connected.

A casing is provided through which the input shaft extends and within which is mounted the harmonic drive means, the magnetic rotor means and the stator means. The flexspline and the stator means are rigidly connected to the casing so as to be stationary therewith. The casing further includes first bearing means for supporting the high speed output shaft. More particularly, the casing includes a substantially cylindrical side wall and a pair of end plates, each of the end plates having a bearing sleeve through which the input shaft extends and in which the first bearing means are mounted. A housing for the stator means is rigidly mounted to one of the end plates of the casing and surrounds the rotor means and the output shaft. The second bearing means is positioned between the high speed output shaft and the housing, and the flexspline includes an end wall mounted between said one end plate of the casing and the housing.

The magnetic rotor means comprises a samarium cobalt magnet which is attached to the outer surface of the high speed output shaft so as to rotate therewith.

In a second embodiment of the invention, the flashlight circuit includes a first Zener diode. The purpose of the first Zener diode is to provide voltage regulation to the output of the alternator when only the alternator is used to power the light. This is done to prevent the light from burning out from overvoltage. The electric switch in the second embodiment comprises a first pole, a second pole, a first contact, a second contact, and a third contact. The second pole is capable of being operated independently of the first pole. The first pole and the second pole are both connected to the rectifier. The first contact is connected to the light, the second contact is connected to the rechargeable battery, and the third contact is connected to the first Zener diode.

The third embodiment of the invention has two Zener diodes (a second Zener diode and a third Zener diode). The Zener voltage of the third Zener diode is greater than that of the second Zener diode. The purpose of the second Zener diode is to regulate the voltage from the alternator when only the alternator is used to operate the light. This prevents the light from burning out from overvoltage. The third Zener diode is used only when the alternator only charges the batteries. It prevents the batteries from being overcharged. The Zener voltage of the third Zener diode is higher than the Zener voltage of the second Zener diode because the batteries require less protection than the light. The electric switch in this embodiment has a first pole, a second pole, a first contact, a second contact, a third contact, and a fourth contact. The second pole is capable of being operated independently of the first pole. The first pole and the second pole are both connected to the rectifier. The first contact is connected to the light bulb, the second contact is connected to the third Zener diode, the third contact is connected to the second Zener diode, and the fourth contact is connected to the rechargeable batteries.

DESCRIPTION OF THE PREFERRED EMBODIMENTS

The preferred embodiment of the present invention is illustrated in FIG. 1. It comprises a metallic case 60, which may be cylindrical tube with screw threads at each end. A bottom cap 62 screws on the bottom of cylinder 60. A top ring 64 screws on the top of cylinder 60. Top ring 64 holds window 68 and metallic parabolic reflector 66 in place at the top of cylinder 60. At the center or focus of parabolic reflector 66 is a light bulb 70. Light bulb 70, which has a side and a bottom contact, is mounted in light bulb socket 72. Light bulb socket 72 is attached to parabolic reflector 66. Attached to cylinder 60 is electrical switch means 74. Attached inside cylinder 60 is a terminal block 78, which has a conducting spring bar 76 extending from it to the bottom contact of light bulb 70. Terminal block 78 is insulated from contact with cylinder 60 by means not illustrated. The other contact of light bulb 70 is in electrical contact with metallic parabolic reflector 66. Also mounted within cylinder 60 are the hand-cranked electrical power source 10, rectifier 80, and rechargeable batteries 82. The metal case 60 acts as the flashlight's electrical ground.

Figure 2:
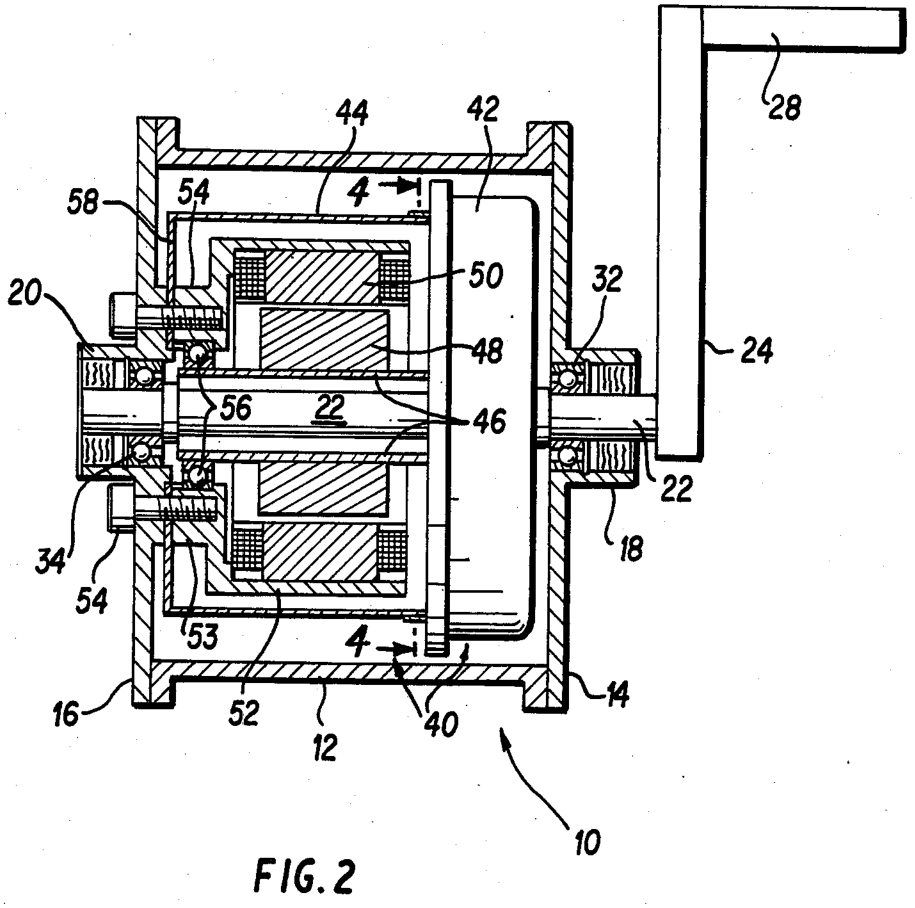
FIG. 2 is a side, partially sectional view of the hand-cranked electrical power source of the present invention.

Referring now to FIG. 2, there is illustrated a side, partly sectional veiw of a preferred embodiment of the hand-cranked electrical power source of the present invention. This hand-cranked generator was first described in U.S. Pat. No. 4,227,092 to Campagnuolo et al. This patent is incorporated herein by reference.

Reference numeral 10 indicates generally a hand-cranked electrical power souce which includes a substantially cylindrical side wall 12 and a pair of end plates or covers 14 and 16 which may be secured to the side wall 12 by any conventional means.

Positioned centrally on the end plates 14 and 16 are a pair of substantially cylindrical sleeves 18 and 20. A low speed drive shaft 22 extends through the casing 10, case 60 and sleeves 18 and 20. Secured to one end of low-speed drive shaft 22 is a cranking lever 24, which has a hand grip 28. Hand grip 28 is adapted to be manually rotated by a user, and the motion is transmitted by lever 24 to the low-speed drive shaft 22. The other end of low-speed drive shaft terminates in cylindrical sleeve 20. Sleeve 20 is attached by conventional means to the inside of case 60, while sleeve 18 passes through case 60.

Within the sleeves 18 and 20 are mounted a pair of bearing assemblies 32 and 34 for supporting and facilitating the rotation of drive shaft 22.

Mounted within the casing 10 of the present invention is a harmonic drive assembly, indicated generally by reference numberal 40, which is designed to step up the rotation of low speed drive shaft 22. A harmonic drive is a well known component which relies for operation upon a strain wave gearing concept as first set forth in U.S. Pat. No. 2,906,143 to C. W. Musser. This patent is incorporated herein by reference.

As is well known, harmonic drive assembly 40 consists of three basic components: a circular spline 42; a flexspline 44; and a wave generator 43.

Figure 3:
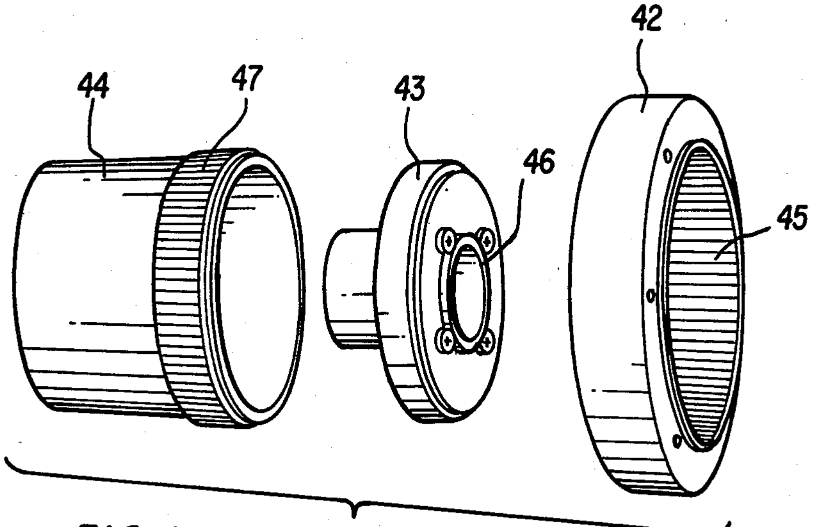
FIG. 3 is a perspective, exploded view illustrating the standard components which comprise a harmonic drive assembly which is utilized in the hand-cranked electrical power source of FIG. 2.
Figure 4:
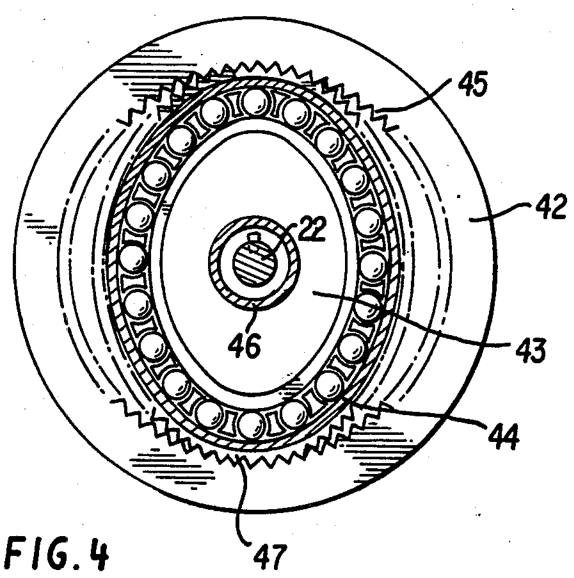
FIG. 4 is a cross-sectional view of the hand-cranked electrical power source of FIG. 2 taken along line 4—4 thereof.

These components are illustrated in a perspective, exploded view in FIG. 3. The circular spline 42 is a ring-shaped member upon the inner periphery of which is formed a plurality of fine gear teeth 45. Circular spline 42 is directly coupled to the low speed drive shaft 22 so as to rotate therewith.

Within the circular spline 42 is positioned the flexspline 44 which is a substantially cylindrical, flexible steel ring having positioned on its outer surface a plurality of fine gear teeth 47 which are identically sized with those on the inner periphery 45 of the circular spline 42 so as to mesh therewith. However, as is conventional, the flexspline 44 has two fewer teeth than is formed on the circular spline 42.

Positioned within the flexspline 44 is a wave generator 43 which comprises, as is conventional, an elliptical steel ball-bearing assembly. The wave generator 43 include a high-speed output shaft 46 extending therefrom.

As shown in FIG. 2, secured to the periphery of the high speed output shaft 46 is a multi-pole magnetic rotor 48, which is preferably comprised of samarium cobalt. Samarium cobalt magnets are preferred as a result of their unique properties, that include for example an energy product and an intrinisic coercivity which far exceed the corresponding values of the best permanent magnet materials previously available.

A cup-shaped stator support or housing 52 includes a reduced-diameter sleeve 53 which is secured to the end wall 16 of casing 10 by means of bolts or screws 54.

Mounted between the sleeve 53 of housing 52 and the distal end of high speed shaft 46 are bearings 56 for supporting rotation of shaft 46.

Note that the flexspline 44 includes an apertured end wall 58 which is sandwiched between the sleeve 53 of housing 52 and the wall 16 of casing 10 to retain the flexspline 44 stationarily within casing 10.

Positioned on the inner cylindrical surface of stator support housing 52 is a multi-pole stator assembly 50 which, together with the samarium cobalt magnetic rotor 48, forms an alternator assembly. A pair of output leads (not illustrated) are also provided.

In operation, since the circular spline 42 contains two more teeth than the flexspline 44, rotation of the former causes the latter to deform into an elliptical shape thereby engaging the wave generator through its major axis. A continuous torque application through low speed input shaft 22 causes a shift of the major axis on the flexspline 44, such that for every two teeth engagement the wave generator 43, coupled to output shaft 46, completes one full turn. By way of example, if the circular spline 42 contains 202 teeth, and the flexspline 44 contains 200 teeth, whenever the shaft 22 makes one complete revolution, the wave generator output shaft 46 has gone through one hundred revolutions, achieving a 100:1 gear ratio.

Clearly, the rotor 48 rotates at the same rotational speed as the output shaft 46 of the wave generator. Therefore, continuing the above example, if the input shaft 22 is turned via hand crank 24, and handle 28, at forty revolutions per minute, the rotor 48 of the alternator will be rotating at 4,000 r.p.m.

As a result of the fact that samarium cobalt contains approximately four times the energy product of the best alnico magnets presently available, a multi-pole rotor 48 of approximately 1.5 inches in diameter can produce approximately 200 watts of electrical energy as a rotational speed of about 4,000 r.p.m.

Figure 5:
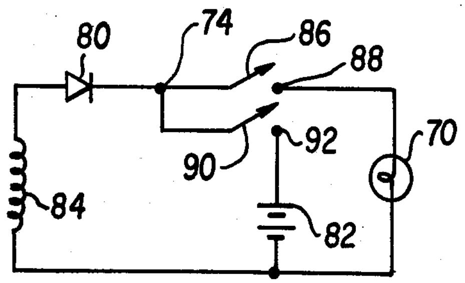
FIG. 5 is a schematic diagram of the electrical circuit of the multimode flashlight.

FIG. 5 is a schematic diagram of the circuit of the invention. The alternator, represented by coil 84, is connected in series with rectifier diode 80. The switch 74, in series with diode 80, has two poles 86 and 90, and two contacts 88 and 92. Rechargeable battery 82 is connected to contact 92, and light bulb 70 is connected to contact 88. Each pole of switch 74 can be operated separately. If pole 86 is closed to make contact with contact 88, then light bulb 70 will light only if alternator 84 is operated. If pole 90 is closed to make contact with contact 92, then battery 82 is charged if alternator 84 is operated. The back resistance of diode 80 prevents battery 82 from discharging across alternator coil 84 if the alternator is not being operated. If both poles 86 and 90 are closed, then the light bulb 70 will light from current provided by battery 82 and alternator 84, or by battery 82 only if alternator 84 is not being operated. Although not illustrated, a diode bridge could replace diode 80 if full wave rectification is desired.

Figure 6:
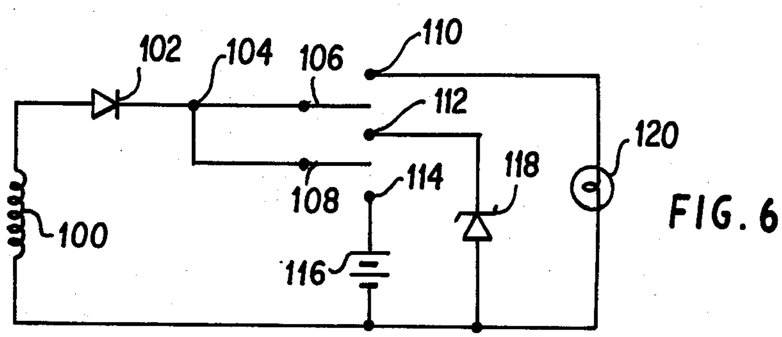
FIG. 6 is a schematic diagram of a second embodiment of the electrical circuit of the multimode flashlight.

FIG. 6 is a schematic diagram of an alternate embodiment of the circuit of the invention. The alternator, represented by coil 100, is connected in series with rectifier diode 102. The switch 104, in series with diode 102, has two poles 106 and 108, and three contacts 110, 112 and 114. Each pole of switch 104 can be operated separately. Contact 110 is connected to light 120, contact 112 is connected to Zener diode 118, and contact 116 is connected to rechargeable battery 116. In operation, if it is desired that only battery 116 operate light 120, then pole 106 is closed to make contact with contact 110, and pole 108 is closed to make contact with contact 114. In this situation the back resistance of diode 102 prevents battery 116 from discharging across alternator coil 100 if the alternator is not being operated. If it is desired to operate the light with only the alternator, then pole 106 is set to make contact with contact 110, and pole 108 is set to make contact with contact 114. In this situation, diode 102 rectifies the output of alternator 100, and Zener diode 118 prevents an overvoltage situation from occuring across light 120 by regulating the voltage from alternator 100. If it is desired to simultaneously charge battery 116 and operate light 120, then pole 106 is set to make contact with contact 110, and pole 108 is set to make contact with contact 114. In this situation battery 116 regulates the voltage output of alternator 100, which prevents an overvoltage situation from occurring across light 120. If it is desired to only charge battery 116 by alternator 110, then only pole 108 is closed to make contact with contact 114.

Figure 7:
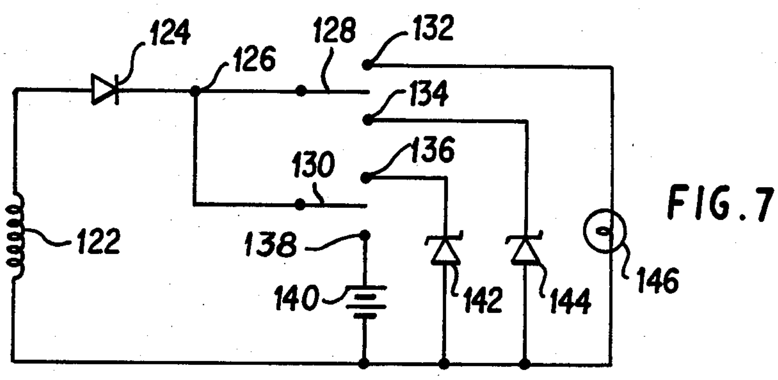
FIG. 7 is a schematic diagram of a third embodiment of the electrical circuit of the multimode flashlight.

FIG. 7 is a schematic diagram of another embodiment of the circuit of the invention. The alternator, represented by coil 122, is connected in series with diode 124. The switch 126, in series with diode 124, has poles 128 and 130, and contacts 132, 134, 136, and 138. Contact 132 is connected to light 146, contact 134 is connected to Zener diode 144, contact 136 is connected to Zener diode 142, and contact 138 is connected to rechargeable battery 140. To operate light 146 only by battery 140, pole 128 is closed to make contact with contact 132, and pole 130 is closed to make contact with contact 136. In this situation the back resistance of diode 124 prevents battery 140 from discharging across alternator coil 122 if the alternator is not being operated. To operate light 146 by only alternator 122, pole 128 is closed to make contact with contact 132, and pole 130 is closed to make contact with contact 136. Zener diode 142 acts in this situation to regulate the voltage from alternator 122 so as to prevent an overvoltage situation from occurring across light 146. To simultaneously charge battery 140 and operate light 146, pole 128 is closed to make contact with contact 132, and pole 130 is closed to make contact with contact 138. Battery 140 provides voltage regulation of the output of alternator 122 in this situation. Finally, to only charge battery 140 by alternator 122, pole 128 is closed to make contact with contact 134, and pole 130 is closed to make contact with contact 138. Zener diode 144 acts to regulate the voltage from alternator 122 to prevent an overvoltage situation from occurring across battery 140. The Zener voltage of Zener diode 144 is higher than the Zener voltage of Zener diode 142 since battery 140 requires less protection then light 146.

While the invention has been described to make reference to the accompanying drawings, we do not wish to be limited to the details shown therein as obvious modifications may be made by one of ordinary skill in the art.

We claim:

1. A flashlight comprising:

a relatively low-speed input shaft and a relatively high-speed output shaft;

means for manually rotating said input shaft;

a ring-shaped circular spline directly coupled to said input shaft so as to rotate therewith and having a plurality of fine teeth formed on its inner surface;

a substantially cylindrical flexspline having an end with a plurality of fine teeth formed thereon and positioned within said circular spline, the number of teeth on said flexspline different from that one said circular spline;

a wave generator positioned within said flexspline and comprising an elliptical ball-bearing assembly to which said high-speed output shaft is rigidly connected;

an alternator having rotor means and stator means, said rotor means being directly coupled to said output shaft so as to rotate therewith and said stator means positioned about said rotor means for generating electrical energy in response to rotation of said rotor means;

diode means for rectifying the electric current produced by said alternator, said diode means having an input connected to said alternator and an output;

at least one rechargeable battery;

a parabolic reflector;

a light bulb, said light bulb mounted at the center of said parabolic reflector;

a first Zener diode;

a second Zener diode;

electric switch means for connecting said diode means output to either the lightbulb or the battery, or to both the light and the battery comprising a first pole, a second pole, said second pole capable of being operated independently of said first pole, said first pole and said second pole being connected to said diode means, a first contact, said first contact being connected to said light bulb, a second contact,. said second contact being connected to said second Zener diode, a third contac, said third contact being connected to said first Zener diode, and a fourth contact, said fourth contact being connected to said rechargeable battery; and a first case.

2. The device of claim 1 wherein the Zener voltage of said third Zener diode is greater than the Zener voltage of said second Zener diode.

* * * * *